United States Patent
Kim

(10) Patent No.: US 9,419,497 B2
(45) Date of Patent: Aug. 16, 2016

(54) DOUBLE-ROTOR MOTOR

(71) Applicant: AMOTECH CO., LTD., Incheon (KR)

(72) Inventor: Byoung Soo Kim, Anyang-si (KR)

(73) Assignee: AMOTECH CO., LTD. (KR)

( * ) Notice: Subject to any disclaimer, the term of this patent is extended or adjusted under 35 U.S.C. 154(b) by 619 days.

(21) Appl. No.: 13/873,519

(22) Filed: Apr. 30, 2013

(65) Prior Publication Data

US 2013/0234546 A1 Sep. 12, 2013

Related U.S. Application Data

(63) Continuation of application No. PCT/KR2011/008513, filed on Nov. 9, 2011.

(30) Foreign Application Priority Data

Nov. 9, 2010 (KR) .......... 10-2010-0110840
Dec. 27, 2010 (KR) .......... 10-2010-0135482

(51) Int. Cl.
*H02K 11/00* (2016.01)
*H02K 16/02* (2006.01)
(Continued)

(52) U.S. Cl.
CPC .. *H02K 9/04* (2013.01); *H02K 1/18* (2013.01);
*H02K 9/06* (2013.01); *H02K 11/215* (2016.01);
*H02K 21/12* (2013.01); *H02K 1/32* (2013.01);
*H02K 5/225* (2013.01); *H02K 9/02* (2013.01);
*H02K 11/0015* (2013.01); *H02K 16/02* (2013.01)

(58) Field of Classification Search
CPC ............ H02K 11/001; H02K 11/0015; H02K 11/0021; H02K 16/02; H02K 9/02; H02K 9/04; H02K 9/06

USPC ..... 310/68 B, 68 R, 266, 59, 61, 60 A, 62, 63
See application file for complete search history.

(56) References Cited

U.S. PATENT DOCUMENTS 5,698,913 A * 12/1997 Yagi .......................... B61C 9/46
                                                            105/53
7,960,893 B2    6/2011 Kim et al.
(Continued)

FOREIGN PATENT DOCUMENTS

CN    201576968 U  *  9/2010
JP    06284641 A   *  10/1994
(Continued)

OTHER PUBLICATIONS

Jiang (CN 201576968 U) English Translation.*
(Continued)

*Primary Examiner* — Quyen Leung
*Assistant Examiner* — Robert E Mates
(74) *Attorney, Agent, or Firm* — Cantor Colburn LLP

(57) ABSTRACT

Provided is a double-rotor type motor including: a stator; a double-rotor that is positioned at a certain gap on an outer surface and an inner surface of the stator; a rotor support on which the double-rotor is integrally formed and a plurality of air passages are radially penetratively formed; and a heat dissipation unit that is integrally formed with the rotor support and that forcibly ventilates outer air into the air passages during rotation of the rotor, to thereby dissipate heat generated from the stator. Thus, outer air may be forcibly ventilated to the stator, to thereby improve the heat dissipation efficiency of the stator.

11 Claims, 6 Drawing Sheets

(51) Int. Cl.
*H02K 9/02* (2006.01)
*H02K 9/04* (2006.01)
*H02K 9/06* (2006.01)
*H02K 21/12* (2006.01)
*H02K 1/18* (2006.01)
*H02K 1/32* (2006.01)
*H02K 5/22* (2006.01)

(56) References Cited

U.S. PATENT DOCUMENTS

| | | | | |
|---|---|---|---|---|
| 2007/0236099 | A1* | 10/2007 | Kim | D06F 37/304 310/266 |
| 2009/0284087 | A1* | 11/2009 | Takahashi | H02K 5/18 310/62 |
| 2010/0050702 | A1* | 3/2010 | Kim | D06F 37/304 68/23 R |
| 2010/0244616 | A1 | 9/2010 | Li et al. | |
| 2011/0187222 | A1 | 8/2011 | Li et al. | |
| 2011/0316365 | A1* | 12/2011 | Kim | H02K 1/18 310/43 |

FOREIGN PATENT DOCUMENTS

| | | | |
|---|---|---|---|
| JP | 2004048904 A | * | 2/2004 |
| JP | 2009033899 A | * | 2/2009 |
| KR | 100663641 | | 1/2007 |
| KR | 1020080094274 | | 10/2008 |
| WO | 2010044231 | | 4/2010 |
| WO | 2010047098 | | 4/2010 |

OTHER PUBLICATIONS

Kitajima (JP 2009033899 A) English Translation.*
Ozuru (JP 06284641 A) English Translation.*
Hatano (JP 2004048904 A) English Translation.*
International Search Report—PCT/KR2011/008513 dated May 10, 2012.

* cited by examiner

DOUBLE-ROTOR MOTOR

TECHNICAL FIELD

The present invention relates to a double rotor type motor, in which a heat dissipation unit is provided in a rotor, to thus enhance heat dissipation performance of a stator, and a Hall sensor assembly mounting structure is improved, to thus reduce manufacturing costs and enable mass production.

BACKGROUND ART

In general, motors are applied to washing machines, water pumps for vehicles, and the like, and provide power by their rotational motions. Typically, a washing machine receives power of a drive motor located on the bottom of a basket and rotates. The power of the drive motor is transferred to a rotating axis of a load, in which the output shaft of the drive motor is indirectly connected to the rotating axis through a belt, or the output shaft of the drive motor is directly connected to the rotating axis. In recent years, in order to reduce noise, breakdown, and energy waste, and to improve the overall strength of a rotor, and further to promote improvement of a washing function, motors employing a direct connecting mode of a double rotor structure have been in the spotlight.

FIG. 1 is a cross-sectional view of a conventional motor structure for a full-automatic washing machine. The conventional motor rotationally drives a basket and an inner tub of the full-automatic washing machine, and includes: a stator 10 having a large number of cores 11 wound with a coil 12; inner and outer rotors 20a and 20b that are interconnected by a rotor support 23 and that are rotated by a magnetic circuit that is formed when electric power is applied to the coil 12 of the stator 10, in which inner and outer permanent magnets 22a and 22b are mounted in inner and outer back yokes 21a and 21b; and a rotating axis that is combined at the central portion of a support frame 24 that is extended and formed on the inner circumference of the rotor support 23.

In addition, a holder 31 having connectors for connection to a control board (not shown), that is, a driver of the motor is provided at one side of the stator 10. Here, connectors for connection of the holder 31 include a power feeding connector for applying power to the stator 10, and a position signal transmitting connector that is connected to a Hall sensor substrate 33 provided with Hall sensors 34, thus transmitting position signals of the rotors 20a and 20b. The connectors for connection of the holder 31 are connected to the outside through lead wires 32.

Meanwhile, if the control board of the motor receives the position signals of the rotors 20a and 20b detected by the Hall sensors 34, the control board discriminates the rotational speeds of the rotors 20a and 20b, compares the rotational speeds of the rotors 20a and 20b with predetermined target speeds, and controls the rotors 20a and 20b to rotate at the target speeds with a three-phase (that is, U-phase, V-phase, and W-phase) timing signal, depending on the comparison results. Specifically, the control board of the motor transfers pulse waveform generated by combination of the Hall sensors 34 to a drive unit, and selectively switches a switching transistor corresponding to each phase, to thus control a power which is supplied to each phase coil of the stator 10 from a power supply to thereby make the motor driven. Here, the stator 10 is configured to have nine coils 12, in which three coils are assigned to each of the U-phase, V-phase, and W-phase and connected in series, to then make three-phase coils connected to have a Y-connection structure. In this case, when the position signals of the rotors 20a and 20b are sequentially detected by the three Hall sensors 34, the control board of the motor sequentially applies the power to the two-phase coils 12 among the three-phase coils 12 at a certain angle, to thus make the switching transistor driven. In other words, a three-phase motor has three-phase end points that are connected to each other, and repeats three processes of making the current flow in one direction, the current flow in the other direction, and then the current turned off, from the standpoint of one phase.

In particular, the Hall sensors 34 are composed of a lead type, respectively. These lead type Hall sensors 34 are connected on the Hall sensor substrate 33 in which one end of the long lead is inserted into the Hall sensor substrate 33 and then manually soldered. In this case, the Hall sensor substrate 33 on which the Hall sensors 34 are mounted requires peripheral components, such as resistors, capacitors, around integrated circuit (IC) chips that generate the position detection signals of the rotors 20a and 20b, and has essentially a need to perform a surface mount work. However, the conventional Hall sensor mounting structure requires that the Hall sensors 34 should be protruded in a direction perpendicular to the Hall sensor substrate 33 and arranged at the side surface of the inner rotor or outer rotor, in order to detect the rotational positions of the rotors 20a and 20b, since the Hall sensor substrate 33 is disposed in a horizontal direction at one side surface of the stator 10 along the circumferential direction of the motor. Therefore, according to the conventional art, long lead type Hall sensors 34 are mounted on the Hall sensor substrate 33, and one end of the long lead is manually soldered since it is not nearly possible to perform a surface mounting work. As a result, since the Hall sensors 34 may be seceded from the Hall sensor substrate 33 due to the bad soldering, and thus the poor contact may occur, there is a limit to have good reliability between the Hall sensors 34 and the Hall sensor substrate 33.

In addition, the Hall sensor substrate 33 is coupled at a state where the Hall sensors 34 have been inserted into Hall sensor insertion holes provided on the stator 10. The conventional Hall sensor mounting and assembling structures go through a manual insertion and assembly process of directly inserting Hall sensors on a Hall sensor substrate or requiring a separate soldering process. As a result, such a manual insertion and assembly process may cause a motor production cost to rise, and make mass production difficult. Thus, the Hall sensor substrate 33 needs to be made into a structure of being coupled to the stator 10 to facilitate mass production.

In addition, the holder 32 is manufactured into a structure of integrating power feeding connectors with position signal transmission connectors and thus when any one connector is out of order, all connectors need to be replaced to thereby cause unnecessary costs.

In addition, the conventional rotor has a structure that the back yokes 21a and 21b are inserted into the rotor support 23 that accommodates the stator and then the permanent magnets 22a and 22b are fixedly coupled on the back yokes 21a and 21b. In this case, the stator 10 always emits heat from the coils wound on the stator 10 when power is applied to the coils for rotation of the rotor, and accordingly a heat dissipation structure is required to ensure stability of a motor-driven environment. In particular, in the case of a double-rotor type motor, the inner rotor 20b and the outer rotor 20a are provided, to thus emit heat of hotter temperature than one rotor type motor when power is applied to the coils 12. As a result, needs on the heat dissipation structure in the double-rotor type motor are even greater than those of the mono-rotor type motor.

Conventionally, in order to implement such as a heat dissipation structure, height of the stacked stator core 11 is heightened, or capacities of the permanent magnets 22a and 22b in the rotor are enlarged, to thereby increase the torque of the motor, and to thus minimize the load of the stator coils 12 to suppress the amount of heat generated.

However, the conventional motor has no heat dissipation structure of dissipating heat generated from the stator coils, to thus degrade performance of the motor and shorten the life span of the motor.

SUMMARY OF THE INVENTION

To solve the above problems or defects, it is an object of the present invention to provide a double-rotor type motor in which a heat dissipation unit that can forcibly ventilate outer air into a stator during rotation of a rotor is provided in a rotor support, to thereby enhance heat dissipation efficiency.

It is another object of the present invention to provide a double-rotor type motor in which a heat dissipation unit is integrally formed on a rotor support, with no need to have a separate heat dissipation unit for dissipating heat generated from a stator, to thereby reduce a manufacturing cost.

It is still another object of the present invention to provide a double-rotor type motor in which Hall sensors are surface-mounted on a Hall sensor substrate together with other parts to be mounted on the Hall sensor substrate, and a Hall sensor assembly is provided in a stator support in which the Hall sensor assembly couples the Hall sensors in a vertical direction parallel to an axial direction so that the Hall sensor substrate faces an inner or outer rotor, to thereby reduce a manufacturing cost, improve productivity, and achieve mass production.

The objects of the present invention are not limited to the above-described objects, and other objects and advantages of the present invention can be appreciated by the following description and will be understood more clearly by embodiment of the present invention. In addition, it will be appreciated that the objects and advantages of the present invention will be easily realized by means shown in the appended patent claims, and combinations thereof.

To accomplish the above and other objects of the present invention, according to an aspect of the present invention, there is provided a double-rotor type motor comprising: a stator; a double-rotor that is positioned at a certain gap on an outer surface and an inner surface of the stator; a rotor support on which the double-rotor is integrally formed and a plurality of air passages are radially penetratively formed; and a heat dissipation unit that is integrally formed with the rotor support and that forcibly ventilates outer air into the air passages during rotation of the rotor, to thereby dissipate heat generated from the stator.

Preferably but not necessarily, the heat dissipation unit comprises: outer blades that are formed on an outer surface of the rotor support and that ventilate outer air into the air passages during rotation of the rotor; and inner blades that are formed on an inner surface of the rotor support and that ventilate air introduced via the air passages to the stator.

Preferably but not necessarily, the outer blades are protrudingly formed vertically on outer surfaces of support ribs that partition the air passages, and that are radially arranged.

Preferably but not necessarily, guide protrusions are respectively formed at one side of each outer blade in order to guide the air ventilated by the outer blades to the air passages.

Preferably but not necessarily, the guide protrusions are extended in the circumferential direction from both sides of each outer blade and have the same height as that of each outer blade.

Preferably but not necessarily, the inner blades are protrudingly formed vertically on inner surfaces of support ribs that partition the air passages.

According to another aspect of the present invention, there is provided a double-rotor type motor comprising: a stator; a double-rotor that is positioned at a certain gap on an outer surface and an inner surface of the stator; a rotor support on which the double-rotor is integrally formed and a plurality of air passages are radially penetratively formed; a heat dissipation unit that is integrally formed with the rotor support and that forcibly ventilates outer air into the air passages during rotation of the rotor, to thereby dissipate heat generated from the stator; and a Hall sensor assembly that is mounted on a stator support supporting the stator, wherein the Hall sensor assembly comprises: Hall sensors that are placed facing permanent magnets of the double-rotor; a Hall sensor substrate on which the Hall sensors are surface-mounted; and a Hall sensor holder into which the Hall sensor substrate are inserted and that is mounted on the stator, and wherein an assembly mounting unit on which the Hall sensor assembly is mounted is formed on the stator support so that the Hall sensor substrate is disposed in a vertical direction parallel to an axial direction.

Preferably but not necessarily, the Hall sensor assembly comprises pin type terminals for connection to outer terminals.

Preferably but not necessarily, the Hall sensor holder comprises: a vertical accommodator for accommodating the Hall sensor assembly; and a horizontal coupler that is coupled to the stator support, and wherein the coupler is bent a number of times and formed on and coupled to the assembly mounting unit to increase surface contact.

Preferably but not necessarily, the accommodator of the Hall sensor holder is formed to a contact point in place of a core of the stator.

Preferably but not necessarily, the Hall sensors are surface-mount device (SMD) components that are surface-mounted on the Hall sensor substrate, together with other components provided on the Hall sensor substrate.

Preferably but not necessarily, the Hall sensor assembly is disposed separately from a power supply that applies power to coils of the stator.

Preferably but not necessarily, an assembly frame is mounted on the stator support, the Hall sensor assembly is mounted on an upper surface of the assembly frame, and the power supply is mounted on a lower surface of the assembly frame.

Preferably but not necessarily, the Hall sensor assembly is mounted at the same point in place as that of the power supply on the circumference of the stator support, and is separately dismantled from the power supply.

Preferably but not necessarily, the Hall sensor holder is formed in a structure of being inserted in correspondence to a groove formed on an inner circumferential surface of the stator support.

As described above, a double-rotor type motor according to the present invention can improve a heat dissipation performance of a stator, in which inner and outer blades are radially formed on a rotor support, to thus forcibly ventilate outer air to the stator.

In addition, in a double-rotor type motor according to the present invention, a heat dissipation unit is integrally formed on a rotor support, with no need to have a separate heat dissipation unit for dissipating heat generated from a stator, to thereby reduce a manufacturing cost.

In addition, in a double-rotor type motor according to the present invention, inner blades, outer blades and guide protrusions are formed on a rotor support, to thus support a frame structure and to thereby improve overall strength.

Also, in a double-rotor type motor according to the present invention, Hall sensors are surface-mounted on a Hall sensor substrate together with other parts to be mounted on the Hall sensor substrate, and a Hall sensor assembly is used in which the Hall sensor substrate is coupled in a vertical direction parallel to an axial direction so that the Hall sensor substrate faces an inner or outer rotor, to thus make it unnecessary to perform a separate assembly process for the Hall sensors, and to thereby improve productivity, and achieve mass production.

In addition, according to the present invention, a Hall sensor assembly is separately mounted from a power supply, to thus prevent unnecessary costs from occurring, by replacing the Hall sensor assembly or the power supply that is out of order, without replacing both of the Hall sensor assembly and the power supply.

DETAILED DESCRIPTION OF THE INVENTION

Aforementioned objects, features and advantages will become clearer through a detailed description which is described below in detail with reference to the accompanying drawings. Accordingly, one of ordinary skill in the art can easily carry out technical spirit of the present invention. In the description of the present invention, if it is determined that a detailed description of commonly-used technologies or structures related to the invention may unnecessarily or unintentionally obscure the subject matter of the invention, the detailed description will be omitted. Hereinafter, preferred embodiments of the present invention will be described in detail with reference to the accompanying FIGS. 2 to 11.

Figure 1:
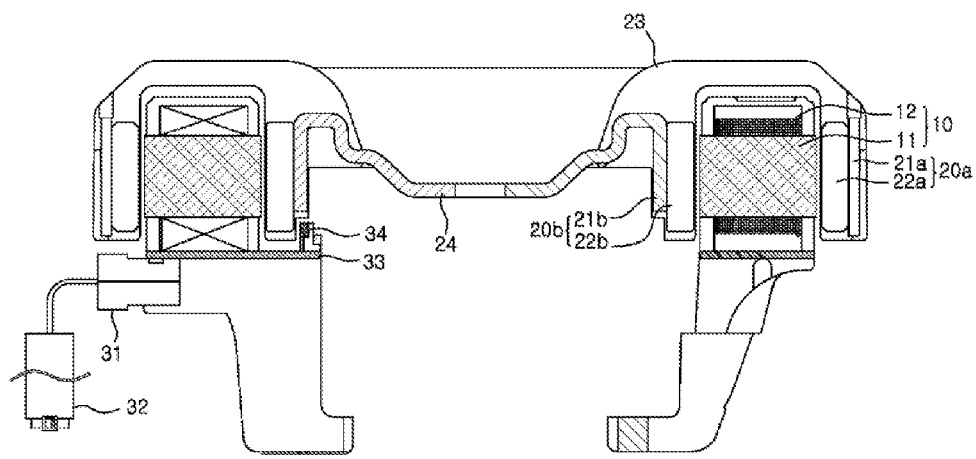
FIG. 1 is a cross-sectional view of a motor according to the prior art.
Figure 2:
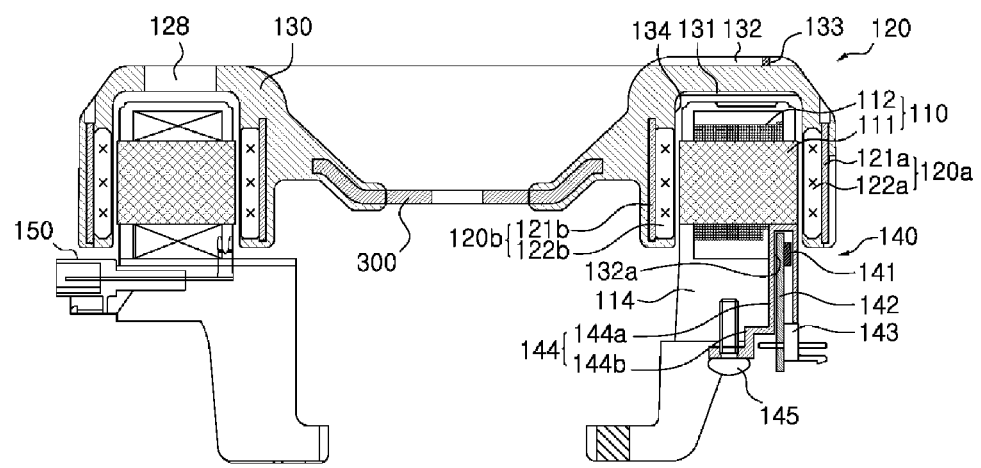
FIG. 2 is a cross-sectional view of a motor in accordance with an embodiment of the present invention.

FIG. 2 is a cross-sectional view of a motor in accordance with an embodiment of the present invention.

As shown in FIG. 2, a motor according to an embodiment of the present invention includes a stator 110 having a large number of cores 111 and coils 112 wound on outer circumferential surfaces of the cores 112, a double-rotor 120 that is positioned at a certain gap on an outer surface and an inner surface of the stator 110; a rotor support 130 on which the double-rotor 120 is integrally formed and to which a rotating axis is fixed.

The double-rotor 120 includes an outer rotor 120a that is positioned at a certain gap on an outer surface of the stator 110, and an inner rotor 120b that is positioned at a certain gap on an inner surface of the stator 110.

The outer rotor 120a includes an outer back yoke 121a mounted at the outside of the rotor support 130 and an outer permanent magnet 122a mounted on the inner surface of the outer back yoke 121a.

The inner rotor 120b includes an inner back yoke 121b mounted on the inside of the rotor support 130 and an inner permanent magnet 122b mounted on the outer surface of the inner back yoke 121b.

A support frame 300 is fixed at the center of the rotor support 130, and a rotating axis is fixed to the support frame 300.

Figure 3:
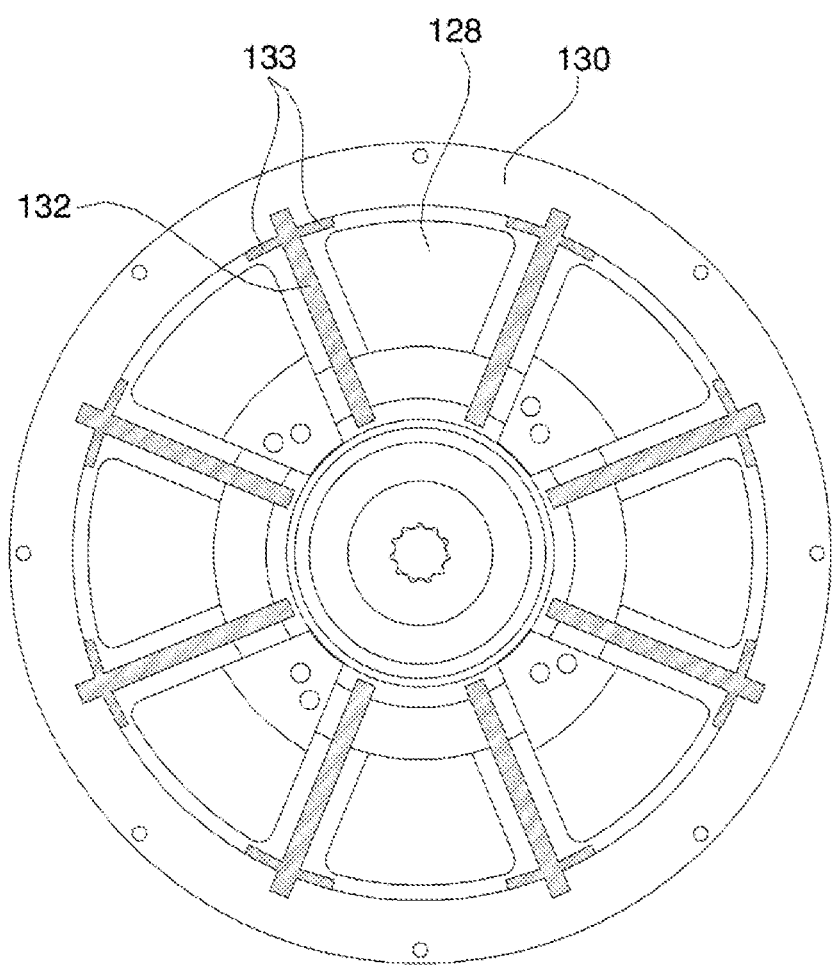
FIG. 3 is a top view of a rotor according to an embodiment of the present invention.
Figure 4:
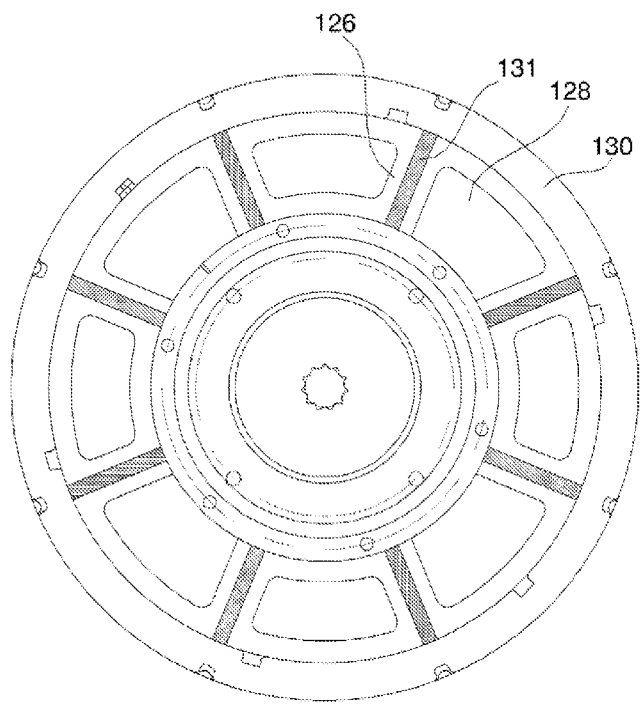
FIG. 4 is a bottom view of a rotor according to an embodiment of the present invention.
Figure 5:
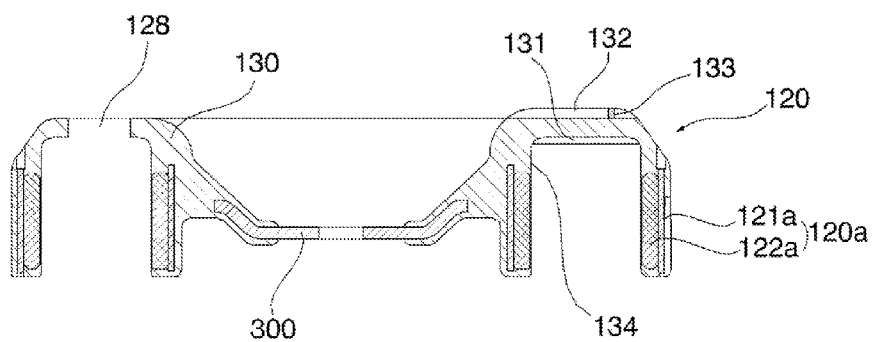
FIG. 5 is a cross-sectional view of a rotor according to an embodiment of the present invention.

FIG. 3 is a top view of a rotor according to an embodiment of the present invention. FIG. 4 is a bottom view of a rotor according to an embodiment of the present invention. FIG. 5 is a cross-sectional view of a rotor according to an embodiment of the present invention.

The rotor support 130 is formed to have a donut-shaped stator accommodating groove 134 for accommodating the stator 110, in which a plurality of air passages 128 are radially formed so that outer air is introduced into the inside of the rotor support 130 through the top of a stator accommodation groove 134 on the drawings.

Here, the air passages 128 that are formed on the rotor support 130 play a role of air paths through which outer air are introduced into the stator as well as reducing weight of the rotors, to thereby enable a lightweight design.

A heat dissipation unit is formed in the rotor support 130 and forcibly inhales air via the air passages 128 during rotation of the double-rotor 120, to thereby dissipate heat generated from the stator 110.

The heat dissipation unit includes: outer blades 132 that are formed on an outer surface of the rotor support 130 and that forcibly ventilate air into the air passages 128 during rotation of the rotor; and inner blades 131 that are formed on an inner surface of the rotor support 130 and that forcibly ventilate air introduced via the air passages 128 to the stator 110.

The outer blades 132 are protruded vertically at a predetermined height from support ribs 126 that are respectively formed between the air passages 128, and are radially arranged in a circumferential direction of the rotor support 130.

Guide protrusions 133 are respectively formed at one side of each outer blade 132 in order to guide the air ventilated by the outer blades 132 to the air passages 128.

The guide protrusions 133 are respectively formed with a predetermined length in the circumferential direction from both sides of each outer blade 132 and have the same height as that of each outer blade 132.

The guide protrusions 133 are respectively formed at both corner portions of each air passage 128 and guide the air ventilated by the outer blades 132 to the air passages 128.

The inner blades 131 are protruded vertically at a predetermined height from the inner surfaces of the support ribs 126 that are respectively formed between the air passages 128, and are radially arranged in a circumferential direction of the rotor support 130.

The guide protrusions 133 are formed relatively adjacent to the outer rotor 120a in comparison with the inner rotor 120b, to thereby induce a large centripetal force and to thus increase an effect of making a wind caused by the inner blades 131 and the outer blades 132 blow to the stator 110. In addition, these inner blades 131, outer blades 132, and the guide protrusions 133 are formed on the rotor support 130 support a frame structure, to thereby increase the overall intensity.

The rotor support 130 opens the bottom of the stator accommodating groove 134 on the drawings and accommodates the stator 110. In this case, the rotor support 130 is formed to have the inner rotor 120b and the outer rotor 120a on the inner and outer side surfaces of the stator accommodating groove 134. Here, the stator 110 is combined with the upper end of the stator accommodating groove 134 while keeping a space to a degree.

Accordingly, the guide protrusions 133 are provided to enlarge a contact area the wind generated by the inner blades 131 and the outer blades 132 with respect to the stator 110 during rotation, to thereby maximize a heat dissipation structure.

The stator 110 is supported by a stator support 114 so as to face the outer and inner rotors 120a and 120b while maintaining a predetermined interval. In this case, the outer rotor 120a and the inner rotor 120b is formed to have a double-rotor structure in which the outer and inner rotors 120a and 120b are positioned at the inner and outer portions with respect to one stator 110.

A Hall sensor assembly 140 for sensing position of the outer rotor 120a is coupled at the outside of the stator support 114. In this case, when the stator support 114 is integrally molded with the stator 110 consisting of a number of split-cores by using an injection molding resin, an assembly mounting portion 132a is provided at the outside of the stator support 114, as a structure of mounting a Hall sensor assembly 140 for arranging a Hall sensor substrate 142, in a vertical direction, that is, in the direction of the rotating axis.

Specifically, the Hall sensor assembly 140 includes a Hall sensor 141, a Hall sensor substrate 142, a terminal block 143, a Hall sensor holder 144, and a screw or a bolt 145.

In the case of a three-phase driving system, at least two Hall sensors 141, or typically three Hall sensors are surface-mounted on the Hall sensor substrate 142, together with other components. In other words, the Hall sensors 141 are manufactured as surface mount device (SMD) components. In this case, the Hall sensor substrate 142 is inserted into and fixed to the Hall sensor holder 144, and the Hall sensor holder 144 is coupled on the stator support 114 in the vertical direction. As a result, the Hall sensor 141 is placed opposite to the outer rotor 120a. This means that there is no need to separately adjust orientation of the Hall sensors 141 to detect a magnetic force of the outer rotor 120a.

In addition, this means that SMD components may be used as the Hall sensors 141 together with other parts (for example, resistors, capacitors, etc.) mounted on the Hall sensor substrate 142 and surface-mounted by a surface mount work, simultaneously with other parts, to thereby reduce a manufacturing cost and remove a separate manual insertion and assembly process, and to thus improve reliability and mass-production. Here, the Hall sensors 141 interact with the stator 110 and thus detects a magnetic flux of the rotating the outer rotor 120a.

In addition, a terminal block 143 is inserted into and coupled on the Hall sensor substrate 142. In this case, the terminal block 143 is soldered on the back of the Hall sensor substrate 142 and is electrically and physically combined with the Hall sensor substrate 142. Here, the terminal block 143 is formed of pin type terminals, and may be easily connected with and disconnected from a driver by using cables between the driver and the terminal block 143. In this case, the terminal block 143 may be formed of female connectors for connection with a control device such as the driver.

The Hall sensor holder 144 has a shape of achieving a surface contact along the surface of the assembly mounting portion 132a, and is formed into a frame having a vertical accommodator 144a that is formed in a vertical direction in order to fix the Hall sensor substrate 142 to avoid the Hall sensor substrate 142 from moving laterally at a state where the Hall sensor substrate 142 is inserted and housed in the Hall sensor assembly 140, and a horizontal coupler 144b that is formed in a horizontal direction in order to be connected with the assembly mounting portion 132a by a screw or bolt 145.

Specifically, when the accommodator 144a of the Hall sensor holder 144 is combined with the assembly mounting portion 132a, the surface of the accommodator 144a opposite to the outer rotor 120a is placed in a straight line on the stacked surface of the cores 111, without protruding to the outside. Next, the coupler 144b of the Hall sensor holder 144 is formed to have bent portions so as to heighten a surface contact area with respect to the stator support 114 and fixed to the stator support 114 without movement due to vibration of the motor, and to then be surface-mounted on the assembly mounting portion 132a and coupled with the assembly mounting portion 132a by a screw or bolt 145.

Here, the assembly mounting portion 132a is formed to a point in place where the accommodator 144a of the Hall sensor holder 144 is made to contact the cores 111 of the stator 110, in order to dispose the Hall sensors 141 of the Hall sensor assembly 140 closely to the outer rotor 120a. In other words, width of the winding portion of the coils 112 in the stator 110 is reduced for formation of the assembly mounting portion 132a. This enables the Hall sensors 141 of the Hall sensor assembly 140 to better detect the magnetic force formed by outer permanent magnet 122a of the outer rotor 120a.

In addition, the assembly mounting portion 132a has been formed at the outside of the stator support 114 in order to make the Hall sensors 141 of the Hall sensor assembly 140 face the outer rotor 120a, but in contrast the assembly mounting portion 132a may be formed at the inside of the stator support 114.

Meanwhile, the Hall sensor assembly 140 is separately disposed from a power supply 150 for applying power to the coils 112 of the stator 110. Thus, in the case that any one of the Hall sensor assembly 140 and the power supply 150 is out of order, there is a need to replace only the troubled one since the Hall sensor assembly 140 and the power supply 150 have not been integrated, to accordingly prevent an unnecessary cost from being incurred.

As described above, the Hall sensors 141 are surface-mounted on the Hall sensor substrate 142 together with other parts to be mounted on the Hall sensor substrate 142, and the Hall sensor substrate 142 is vertically combined so as to straightly face the outer rotor 120a, in the Hall sensor assembly 140. Accordingly, since there is no need to undergo a separate process of assembling the Hall sensors 141 by considering directions of inserting the Hall sensors 141, additional costs required in the assembly process of the Hall sensors 141 are prevented from being incurred, and an easy structure for the mass production of the Hall sensor assembly 140 is provided.

In addition, the Hall sensor assembly 140 is separately disposed from the power supply 150, to thus prevent unnecessary costs from occurring, by replacing the Hall sensor assembly or the power supply that is out of order, without replacing both of the Hall sensor assembly and the power supply.

Figure 6:
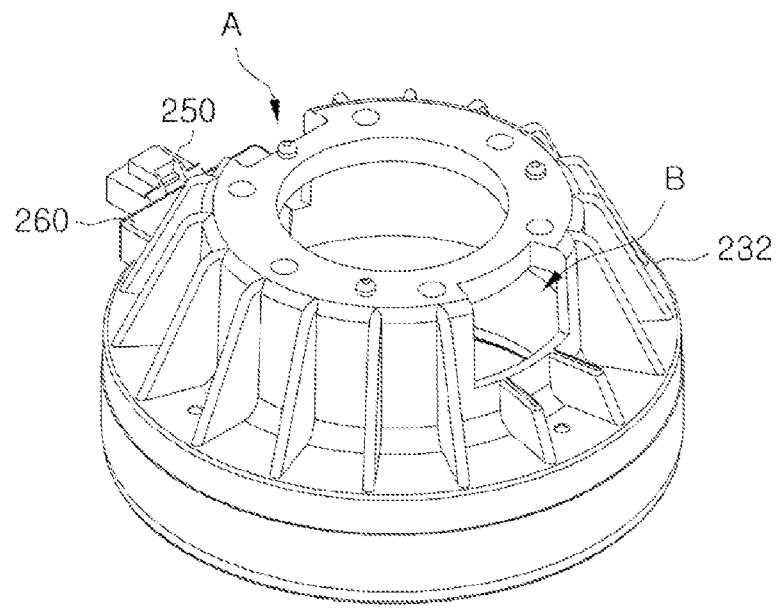
FIG. 6 is a perspective view of a stator having a Hall sensor assembly mounting structure in accordance with another embodiment of the present invention.
Figure 7:
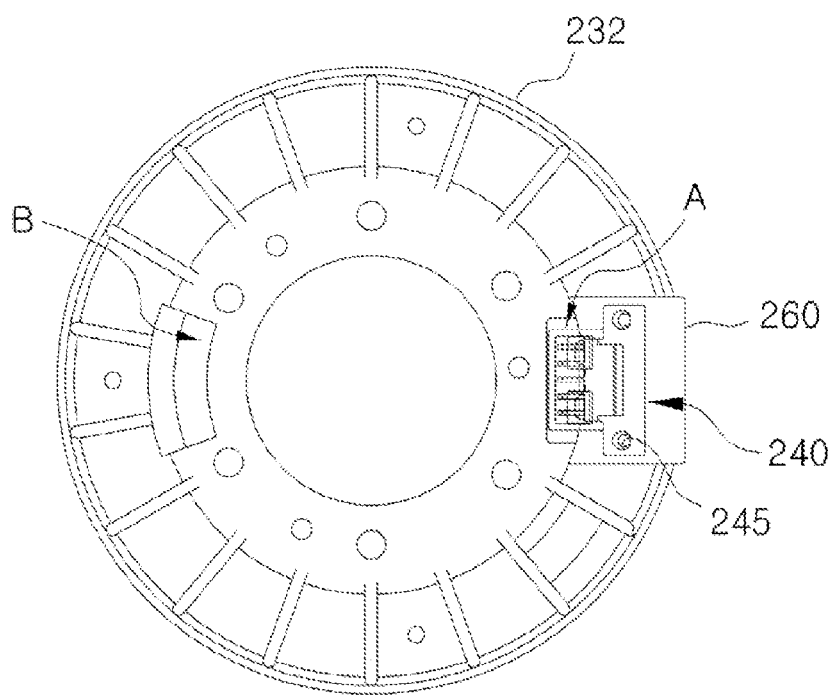
FIG. 7 is a bottom view of a stator having a Hall sensor assembly mounting structure in accordance with another embodiment of the present invention.
Figure 8:
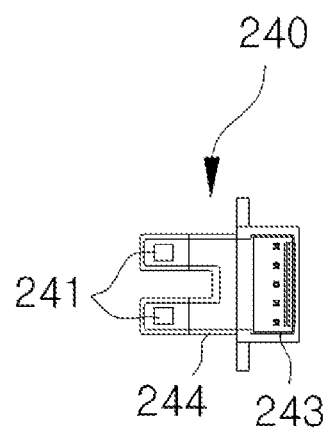
FIG. 8 is a top view of a Hall sensor assembly in accordance with another embodiment of the present invention.
Figure 9:
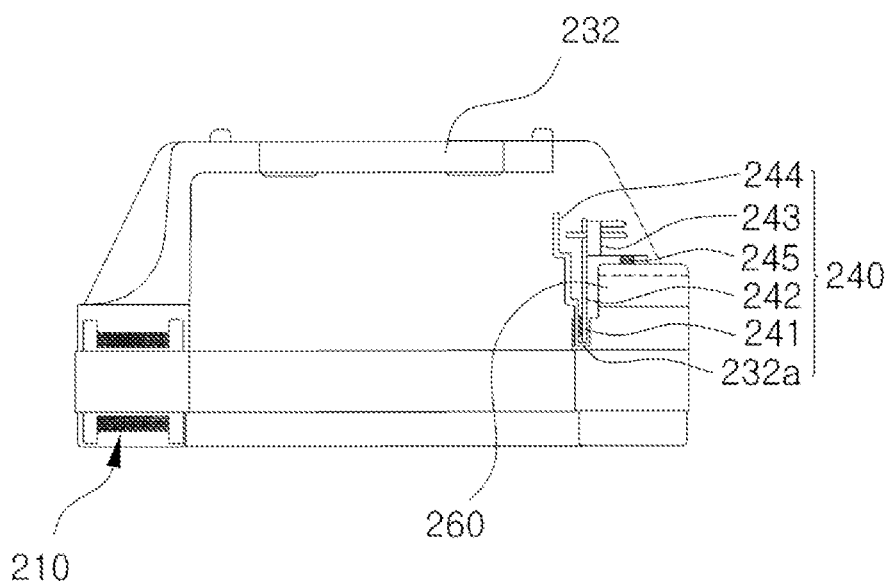
FIG. 9 is a cross-sectional view of a stator having a Hall sensor assembly mounting structure in accordance with another embodiment of the present invention.
Figure 10:
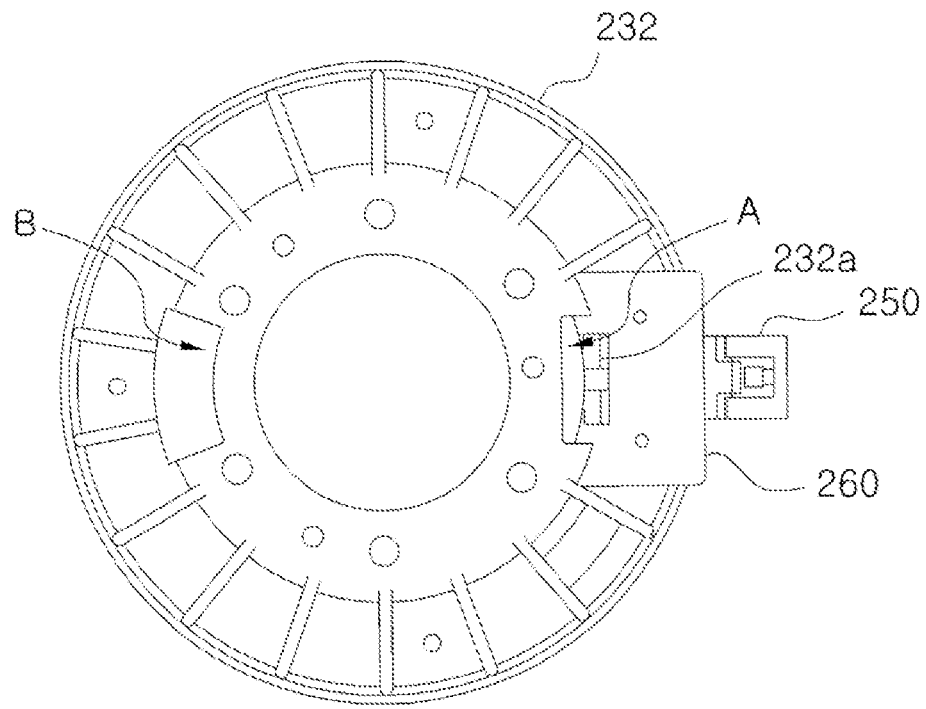
FIG. 10 is a top view of a stator having a Hall sensor assembly mounting structure in accordance with another embodiment of the present invention.
Figure 11:
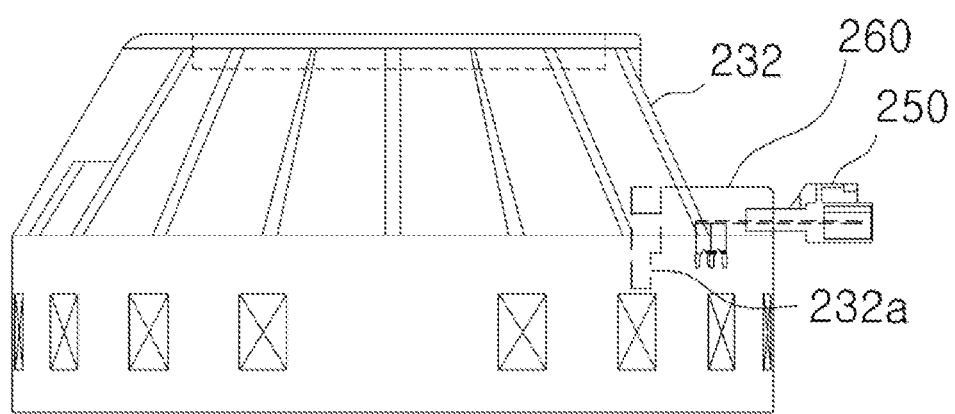
FIG. 11 is a side view of a stator having a Hall sensor assembly mounting structure in accordance with another embodiment of the present invention.

FIG. 6 is a perspective view of a stator having a Hall sensor assembly mounting structure in accordance with another embodiment of the present invention. FIG. 7 is a bottom view of a stator in accordance with another embodiment of the present invention. FIG. 8 is a top view of a Hall sensor assembly in accordance with another embodiment of the present invention. FIG. 9 is a cross-sectional view of a stator in accordance with another embodiment of the present invention. FIG. 10 is a top view of a stator in accordance with another embodiment of the present invention. FIG. 11 is a side view of a stator in accordance with another embodiment of the present invention.

Referring to FIGS. 6 to 11, a Hall sensor assembly mounting structure according to another embodiment of the present invention is configured to have a Hall sensor assembly 240 for sensing position of an inner rotor coupled at the inside of a stator support 232, when a rotor portion is formed of a double-rotor type.

The Hall sensor assembly 240 includes Hall sensors 241, a Hall sensor substrate 242, a terminal block 243, a Hall sensor holder 244, and a screw or bolt 245. Since the structure of the Hall sensor assembly 240 is the same as that of the Hall sensor assembly 140 described in the above embodiment, the detailed description thereof will be omitted.

In addition, when the stator support 232 is integrally molded with a stator 210 by using an injection molding resin, an assembly mounting portion 232a is provided on the inner circumferential surface of the stator support 232, as a structure of mounting the Hall sensor assembly 240 for arranging the Hall sensor substrate 242, in a vertical direction, that is, in a lengthy direction of the rotating axis. Here, a first assembly opening A through which the Hall sensor assembly 240 may be inserted into the assembly mounting portion 232a is formed in the stator support 232, and a second assembly opening B through which a clutch for clutching and releasing a rotating axis may be inserted is formed on the opposite side of the first assembly opening A.

Meanwhile, the Hall sensor assembly 240 is installed at the same point in place as that of the power supply 250 on the circumference of the stator support 232, but is implemented to have a dual structure that the Hall sensor assembly 240 may be separated from the power supply 250 through an assembly frame 260. In other words, the assembly frame 260 functions as a protective cover of the power supply 250 when the power supply 250 is placed at the bottom of the assembly frame 260, and covers power supply 250. A frame for connection of the Hall sensor assembly 240 by screws or bolts is provided on the upper surface of the assembly frame 260.

In addition, a groove for coupling the Hall sensor assembly 240 is formed on the inner circumferential surface of the stator support 232, and thus the Hall sensor holder 244 of the Hall sensor assembly 240 is formed to have a structure of being inserted in correspondence to the recessed groove formed on the inner circumferential surface of the stator support 232. As an example, a convex structure groove is molded on the inner circumferential surface of the stator support 232, and thus the Hall sensor holder 244 of the Hall sensor assembly 240 is formed into a concave structure groove.

As described above, the Hall sensors 241 are surface-mounted on the Hall sensor substrate 242 together with other parts to be mounted on the Hall sensor substrate 242, and the Hall sensor substrate 242 is vertically combined so as to straightly face the inner rotor, in the Hall sensor assembly 240 according to another embodiment of the present invention. Accordingly, since there is no need to undergo a separate manual insertion and assembly process of assembling the Hall sensors 241 by considering directions of inserting the Hall sensors 241, additional costs required in the manual insertion and assembly process of the Hall sensors 141 are prevented from being incurred, and an easy structure for the mass production of the Hall sensor assembly 240 is provided.

In addition, the Hall sensor assembly 120 is separately disposed from the power supply 250, to thus prevent unnecessary costs from occurring, by repairing or replacing the Hall sensor assembly or the power supply that is out of order, without replacing both of the Hall sensor assembly and the power supply.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

The motor configured as described above according to the present invention can be used in a variety of fields that require rotating power such as washing machines, water pumps for vehicles, and drive apparatuses. In addition, because the motor of the present invention is a double-rotor type motor, the rotational torque of the motor can be increased even if an identical power is applied to the motor, to thus improve efficiency of the motor.

What is claimed is:
1. A double-rotor type motor comprising:
   a stator;
   a double-rotor including an inner rotor and an outer rotor;
   a rotor support having an annular groove formed open towards a lower side thereof, the annular groove accommodating the stator and having an inner surface, an outer surface facing the inner surface and an open lower portion, wherein the inner rotor is mounted on the inner surface and the outer rotor is mounted on the outer surface;
   a plurality of air passages formed above the annular groove, each of the air passages penetrating the rotor support while forming a support rib in a radial direction between neighboring air passages;
   an outer blade formed on an upper surface of the support rib, the outer blade protruding upwards by a predetermined height; and
   an inner blade formed on an inner surface opposite to the upper surface of the support rib, the inner blade protruding downwards by a predetermined height,
   wherein the plurality of the air passages, the outer blade and the inner blade form a heat dissipation unit forcibly ventilating outer air through the air passages into the annular groove during rotation of the double-rotor, to thereby dissipate heat generated from the stator.

2. The double-rotor type motor according to claim 1, wherein the inner blade and the outer blade protrude vertically from the inner surface and the upper surface of the support rib.

3. The double-rotor type motor according to claim 1, further comprising a guide protrusion formed with the outer blade at a radially outer side thereof to guide the outer air to the air passages.

4. The double-rotor type motor according to claim 3, wherein the guide protrusion is extended in a circumferential direction from both sides of the outer blade and has a same height as that of the outer blade.

5. A double-rotor type motor comprising:
a stator;
a double-rotor including an inner rotor and an outer rotor having a rotational axis;
a rotor support having an annular groove formed open towards a lower side thereof, the annular groove accommodating the stator and having an inner surface, an outer surface facing the inner surface and an open lower portion, wherein the inner rotor is mounted on the inner surface and the outer rotor is mounted on the outer surface;
a plurality of air passages formed above the annular groove, each of the air passages penetrating the rotor support while forming a support rib in a radial direction between neighboring air passages;
a stator support supporting the stator through the open lower portion of the annular groove;
a heat dissipation unit that is integrally formed with the rotor support and that forcibly ventilates outer air into the air passages during rotation of the double-rotor, to thereby dissipate heat generated from the stator; and
a Hall sensor assembly mounted on the stator support, wherein the Hall sensor assembly comprises: a Hall sensor holder mounted on the stator support, the Hall sensor holder including a vertical accommodator and a horizontal coupler; a Hall sensor substrate inserted into the vertical accommodator in a vertical direction; Hall sensors mounted on the sensor substrate and facing permanent magnets of the outer-rotor, and
wherein the vertical direction is substantially parallel to the rotational axis.

6. The double-rotor type motor according to claim 5, wherein the Hall sensor assembly comprises pin type terminals for connection to outer terminals.

7. The double-rotor type motor according to claim 5, wherein the horizontal coupler is bent a number of times to increase a surface area thereof and surface-contacted with and fastened to the stator support.

8. The double-rotor type motor according to claim 5, wherein an upper end portion of the vertical accommodator of the Hall sensor holder contacts a core of the stator.

9. The double-rotor type motor according to claim 5, wherein the Hall sensors are surface-mount device (SMD) components that are surface-mounted on the Hall sensor substrate, together with other components provided on the Hall sensor substrate.

10. The double-rotor type motor according to claim 5, wherein the Hall sensor assembly is disposed separately from a power supply that applies power to coils of the stator.

11. The double-rotor type motor according to claim 5, wherein an assembly frame is mounted on the stator support, the Hall sensor assembly is mounted on an upper surface of the assembly frame, and a power supply is mounted on a lower surface of the assembly frame.

* * * * *